United States Patent [19]

Tosswill

[11] 4,202,599
[45] May 13, 1980

[54] NONUNIFORM IMAGING

[75] Inventor: Christopher H. Tosswill, Sturbridge, Mass.

[73] Assignee: Galileo Electro-Optics Corporation, Sturbridge, Mass.

[21] Appl. No.: 881,399

[22] Filed: Feb. 27, 1978

Related U.S. Application Data

[63] Continuation-in-part of Ser. No. 706,457, Jul. 19, 1976, Pat. No. 4,099,833, which is a continuation of Ser. No. 449,520, Mar. 8, 1974, abandoned.

[51] Int. Cl.$^2$ ............................................... G02B 5/16
[52] U.S. Cl. .................................................. 350/96.25
[58] Field of Search ........................... 350/96.25, 96.24

[56] References Cited

U.S. PATENT DOCUMENTS

| | | | |
|---|---|---|---|
| 2,992,587 | 7/1961 | Hicks, Jr. et al. | 350/96.25 |
| 3,033,071 | 5/1962 | Hicks, Jr. | 350/96.25 |
| 3,128,167 | 4/1964 | Woodcock | 350/96.25 |
| 3,187,627 | 6/1967 | Kapany | 350/96.25 |
| 3,212,397 | 10/1965 | Miller | 350/96.25 |
| 4,076,378 | 2/1978 | Cole | 350/96.25 |

OTHER PUBLICATIONS

Kapany, *Fiber Optics*, Academic Press, New York and London, 1967, Chapter 9.

*Primary Examiner*—Stewart J. Levy

[57] ABSTRACT

A fiber optic device for nonuniform imaging between two planar surfaces made by taking a pair of cuts through longitudinally spaced portions of a fiber optic bundle, at least one of the cuts intersecting a tapering portion of the bundle and being other than in a plane perpendicular to the bundle axis, and then deforming the length of bundle so cut out to bring at least one of its ends into a changed shape.

2 Claims, 3 Drawing Figures

NONUNIFORM IMAGING

CROSS-REFERENCE TO RELATED APPLICATIONS

This application is a continuation-in-part of my pending application Ser. No. 706,457, now U.S. Pat. No. 4,099,833 filed July 19, 1976, which itself is a continuation of my application Ser. No. 449,520, filed Mar. 8, 1974 and now abandoned.

FIELD OF THE INVENTION

The invention relates to fiber optic devices for nonuniformly magnifying or diminishing images.

BACKGROUND OF THE INVENTION

It is useful in optics to be able to nonuniformly magnify an image. For example, images distorted by other optical elements can thereby be corrected.

In fiber optics, uniform magnification by means of a tapering bundle of fibers is well known. Within the bundle light images are transmitted by the fiber cores by means of internal reflection against the surrounding lower-refractivity cladding. Magnification is achieved by the uniform increase in normal cross-sectional area of the fiber cores within the bundle, each fiber core thereby individually magnifying small elements of an image.

Nonuniform magnification has also been achieved using fiber optics, as is disclosed in my aforesaid applications Ser. Nos. 706,457 and 449,520, and in U.S. Pat. Nos. 3,212,397 to Miller and 3,187,627 to Kapany. But the devices disclosed in my prior applications and in Miller are difficult to fabricate, requiring in one the mating of at least two fiber bundles along precisely ground surfaces, and in the other systematically varying fiber characteristics across the bundle; and one end of Kapany's tapered field flattener is made concave only to compensate for subsequent field curvature inherent in other parts of his optical system.

SUMMARY OF THE INVENTION

I have discovered a fiber optic device for nonuniform imaging between two planar surfaces can be inexpensively made by taking a pair of cuts through longitudinally spaced portions of a fiber optic bundle, at least one of the cuts intersecting a tapering portion of the bundle and being other than in a plane perpendicular to the bundle axis, and then deforming the length of bundle so cut out to bring at least one of its ends into a changed shape. In the preferred embodiment, parallel spherical cuts are taken through a tapering portion and a cylindrical portion and the bundle is deformed to bring its ends into planes perpendicular to the bundle axis.

DESCRIPTION OF THE PREFERRED EMBODIMENT

The structure, manufacture and operation of the preferred embodiment of the invention are as follows:

DRAWINGS

STRUCTURE

Figure 3:
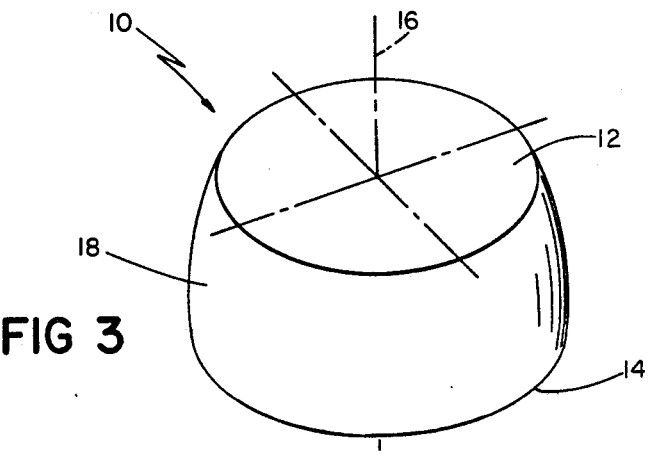
FIG. 3 is an isometric view of said embodiment.

Turning first to FIG. 3, there is shown disc-shaped fiber optic magnifier 10. It has planar input and output surfaces 12, 14 which are parallel to each other and normal to longitudinal axis 16, and outside surface 18, which is slightly bulged outward. Output surface 14 has a 5 cm. diameter, input surface 12 a diameter slightly less than 5 cms.

A multiplicity of optical fibers, having a core and cladding and averaging 20 microns in diameter, make up the magnifier. Between the input and output surfaces, the fiber cores increase in normal cross-sectional area (i.e., the area of cross-sections taken normal the fiber direction). At input surface 12, the normal cross-sectional areas of the fibers decrease with distance radially outward from longitudinal axis 16. At output surface 14, however, the normal cross-sectional areas of fibers are all equal and larger than on the input surface. Thus fiber cores at the periphery undergo a greater relative increase in normal cross-sectional area from the input to output surface than do fibers near the axis.

MANUFACTURE

Figure 1:
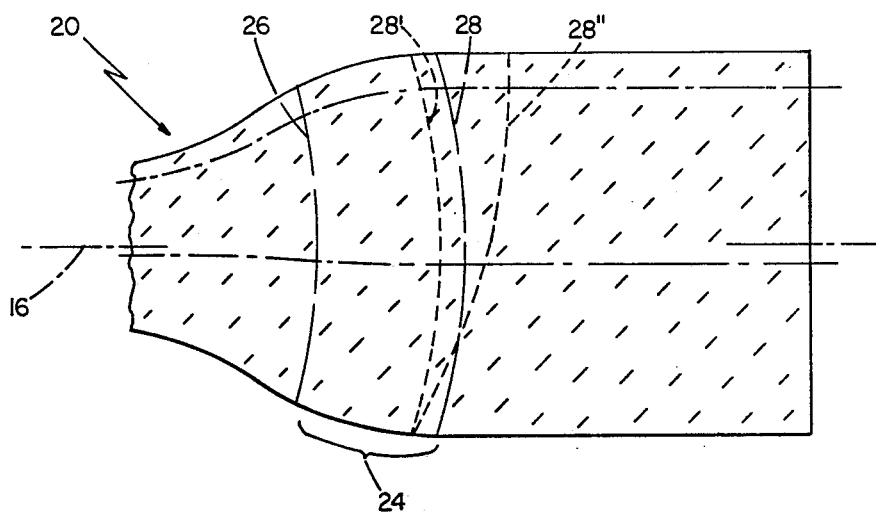
FIG. 1 is a cross-sectional view at the longitudinal axis of a portion of a first intermediate structure in the manufacture of said embodiment.

The magnifier 10 is produced from a conventional tapering fiber optic bundle, a portion of which is shown in cross-section at 20 in FIG. 1. Following the usual practice, the tapered bundle is manufactured by longitudinally extending two ends of a cylindrical bundle that has been heated midway longitudinally between the ends. The bundle has a 5 cm. major diameter which tapers down to a 2 cm. minor diameter in a distance of 5 cm.

The fibers in such tapering bundles undergo an increase in normal cross-sectional area through the tapering portion. And in the tapering as well as the straight section, along cuts made normal to the longitudinal axis, the exposed cross-sectional areas of the fiber cores are equal. Thus, throughout the tapering bundle, the normal cross-sectional areas of the fiber cores are a function purely of longitudinal position. Further, in the tapering portion and notwithstanding the sloping path of the fibers, the exposed cross-sections of the fiber cores (i.e., sections produced by the cutting plane) are circular as well as equal in area.

Manufacture of the nonuniform magnifier 10 begins with the tapering bundle 20 being cut, using conventional lens manufacturing techniques, along parallel spherical surfaces 26, 28, which have their origins spaced 2 cm. apart on axis 16 and have 10 cm. radii. Surface 26 is cut within the tapering portion, and surface 28 within the straight portion. Surface 26, being cut from the tapering portion, intersects the fibers at different normal planes; thus the normal cross-sectional areas of the fiber cores are less at the periphery than at the center. Surface 28, on the other hand, being cut from the straight portion where fiber size is constant for any longitudinal position, has fiber cores having equal normal cross-sectional areas.

Figure 2:
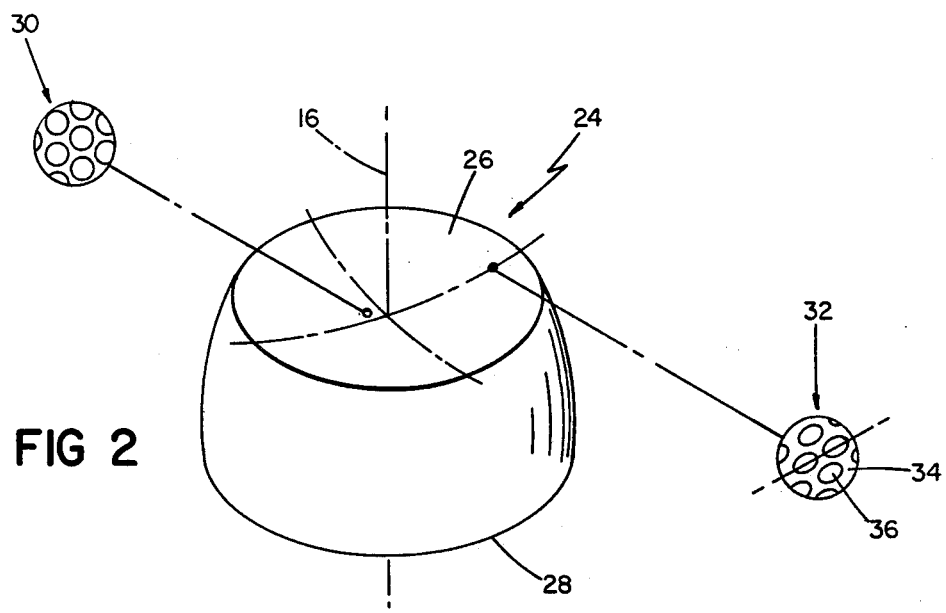
FIG. 2 is an isometric view of a second intermediate structure in the manufacture of said embodiment, with two enlargements which show the appearance of the fiber ends on the concave surface.

In addition to variances in normal cross-sectional area, the exposed cross-sections of the fiber cores on surface 26 vary in shape, owing to the varying angle of intersection between the surface and the fiber direction. As shown in the enlargements in FIG. 2, the cross-sections near the center are circular, as indicated at 30, but cross-sections near the periphery are elliptical (the degree of ellipticity has been exaggerated in the enlargement), as indicated at 32. Cladding glass 34 fills all the interstices between cores 36.

The cut out portion 24 between surfaces 26, 28 is next flattened under heat, changing spherical surfaces 26, 28 into planar surfaces 12, 14 and, bulging outside surface into the most convex shape of surface 18, so as to become magnifier 10 shown in FIG. 3. Flattening is necessary to permit the magnifier to interface with other optical devices. The cut portion is rapidly heated and then flattened by means of a piston and mold, which together apply an external compressive force.

OPERATION

Since input surface 12 (flattened surface 26) has fiber cores that have radially-decreasing normal cross-sectional areas, and output surface 14 (flattened surface 28) has fiber cores of equal areas, images captured by fibers near the periphery are more greatly enlarged than are images captured by fibers near the center. The amount of magnification is the percentage or relative increase in normal cross-sectional area of the individual fiber cores. This relative increase is equal to the percentage change in overall bundle diameter between the longitudinal positions from which the particular fiber was cut. In the preferred embodiment, magnification is approximately 15 percent at the center and 20 percent at the periphery.

OTHER EMBODIMENTS

Other embodiments are within the scope of the description and claims. Other than spherical end surfaces could be used to achieve different patterns of nonuniformity; for example, cylindrical or planar surfaces. And the cuts needn't necessarily be parallel. Where the interfacing optics require surfaces not parallel, such as where one requires a planar image field and the other a spherical field, the cuts taken would be compensatingly non-parallel. Further, manufacturing could begin with nonparallel cut surfaces, and after deformation a grinding step could be used to produce parallel finished surfaces.

With any shape end surfaces, including spherical as here, both surfaces could be cut from the tapering portion (as indicated by dashed line 28' in FIG. 1), as long as the relative change in fiber cross-sectional area between the two ends is not alike for all fibers. Further, by making one cut partially within both the straight and tapering portions (as indicated by dashed line 28" in FIG. 1) and the other entirely within the straight portion, nonuniform magnification can be achieved for only a fraction of the image.

The deformation step, instead of fully flattening the cut out portion, could deform it into whatever shape is required by the interfacing optics, such as a slightly spherical shape. Also, other flattening procedures could be substituted for the piston and mold, such as placing the cut out portion concave side down and heating until flattening occurs as the result of gravity. And grinding could be used to supplement the flattening process in achieving the desired finished shape.

Finally, of course, nonuniform minification can be as readily achieved as magnification; for example, a simple reversal of the disclosed magnifier provides a minifier that diminishes the image more at the periphery than at the center.

What is claimed is:

1. A fiber optic device for nonuniformly magnifying or diminishing an image, said device comprising a segment of a heat-drawn tapered bundle of optical fibers, said fibers terminating at each of two end surfaces and varying in cross-sectional area between said end surfaces, the relative amount of said variation in fiber cross-sectional area between said end surfaces being nonuniform among said fibers, one of said end surfaces cut along a surface intersecting the tapered portion of said bundle and being in other than a plane normal to the longitudinal axis of said bundle, and said device having been deformed to change the shape of said end surfaces to be planar and parallel to each other and perpendicular to the longitudinal axis of the bundle.

2. A fiber optic device for nonuniformly magnifying or diminishing an image, said device comprising a segment of a heat-drawn tapered bundle of optical fibers, said fibers terminating at first and second end surfaces and varying in cross-sectional area between said end surfaces, the relative amount of said variation between said end surfaces being nonuniform among said fibers, said first end surface intersecting the tapered portion of said bundle and being in other than a plane normal to said bundle, and said second end surface intersecting only the untapered portion of said bundle and being parallel to said first end surface.

* * * * *